United States Patent [19]

Slaats et al.

[11] 4,132,483
[45] Jan. 2, 1979

[54] MOLDING MACHINE WITH PROPORTIONAL DISPENSING

[75] Inventors: Mathew A. Slaats; David E. Overton; James E. Blessinger, all of Jasper, Ind.

[73] Assignee: Kimball International, Inc., Jasper, Ind.

[21] Appl. No.: 757,388

[22] Filed: Jan. 6, 1977

Related U.S. Application Data

[63] Continuation of Ser. No. 541,732, Jan. 17, 1975, abandoned.

[51] Int. Cl.$^2$ .............................................. B01F 15/04
[52] U.S. Cl. .................................... 366/162; 366/138; 366/184
[58] Field of Search ............... 366/131, 160, 161, 162, 366/101, 184, 182, 190; 137/510, 567; 222/145

[56] References Cited

U.S. PATENT DOCUMENTS

| | | | |
|---|---|---|---|
| 2,945,507 | 7/1960 | Neuhaus | 137/510 |
| 2,946,488 | 7/1960 | Kraft | 222/334 |
| 3,134,508 | 5/1964 | Bayer | 222/145 |
| 3,175,576 | 3/1965 | Hollings | 137/510 |
| 3,554,226 | 1/1971 | Robbins | 137/567 |
| 3,627,275 | 12/1971 | Gusmer | 366/162 |
| 3,709,468 | 1/1973 | Ives | 366/161 |
| 3,858,852 | 1/1975 | Breer | 366/161 |

Primary Examiner—Robert W. Jenkins
Attorney, Agent, or Firm—Albert L. Jeffers; John F. Hoffman

[57] ABSTRACT

A molding machine for dispensing at least two materials which, when combined, foam and cure within a mold thereby to form a plastic article. The dispensing is accomplished by displacing measured amounts of hydraulic fluid to a pair of chambers within each of which there is located a stainless steel bellows that is supplied with the respective material from a source thereof under pressure. When the displaced hydraulic fluid causes the bellows to collapse, the materials in the bellows are displaced therefrom into a mixing chamber in the form of high velocity jets and are mixed therein and the mixture is forced from the mixing chamber to the mold cavity to be filled. The bellows are then permitted to expand under the pressure of the material supplied thereto and the machine is ready for a further molding cycle.

7 Claims, 2 Drawing Figures

MOLDING MACHINE WITH PROPORTIONAL DISPENSING

This application is a continuation of Ser. No. 541,732, filed Jan. 17, 1975, now abandoned.

The present invention relates to molding machines and is particularly with molding machines in which molding material comprising two main ingredients, for example, polyol and isocyanate together with a foaming agent are mixed together and supplied in the mixed state to a mold cavity. The mixed material reacts in the cavity and foams, due to the foaming agent, and cures within the cavity and the fully shaped workpiece is then removed from the cavity.

Molding arrangements of the nature referred to are known, but heretofore have involved expensive and complicated pumps for handling the plastic material. For example, constant displacement pumps are employed in one method. These pumps circulate the materials at a controlled rate through closed systems. The closed systems includes a passage through the dispensing head which is connected to the mold cavity.

At a precisely timed interval, the recirculating streams of materials are directed out of the dispensing head into a mixing chamber and, by precise and simultaneous timing of the valving arrangements for the separate streams of material, a relatively precise mixture of chemicals, or materials, can be caused to enter the mixing chamber and to be mixed therein. A relatively precise mixture of the various components making up the plastic can, in this manner, be supplied to the mold cavity.

A second known method for molding plastics of the nature aforesaid is through the use of positive displacement pistons that dispense positive amounts of the materials. The pistons, in this case, may be connected to a common yoke which is moved a precise distance to dispense the materials. The amount of the materials dispensed in this case is proportional to the size of the pistons and the displacement thereof.

Both of the methods referred to above can result in arriving at proportional mixing of the chemicals or materials in the mixing chamber which precedes the mold cavity to be filled. Both methods, however, have serious drawbacks and defects in that the materials which are used in the various plastic materials that can be made in this manner do not permit exposure to the outside atmosphere without causing damage or deterioration of the materials or of machine parts wet thereby.

With the foregoing in mind, a primary object of the present invention is the provision of a molding system of the general nature referred to in which all dispensing of material takes place without any exposure of the material being dispensed to the outside atmosphere.

Another object of the present invention is the provision of a dispensing arrangement of the nature referred to in which the machine parts associated with the dispensing mechanism are protected from deterioration due to contact by the materials being dispensed.

A further object of the invention is the provision of a dispensing system in which hydraulic fluid forms the medium for transmitting force or pressure to the materials being dispensed, while the hydraulic fluid is at all times completely isolated from the materials being dispensed.

A still further object is the provision of a novel mixing head through which the materials being dispensed flow and within which mixing head the materials become intimately admixed and from which mixing head the admixed materials are delivered directly to the mold cavity being filled.

Still another object of the invention is the provision of a molding machine, or system, of the nature referred to in which adjustment of the machine to accommodate mold cavities of different size can be effected extremely simply and quickly.

It is a further object to provide a molding machine of the nature referred to in which the relative proportions of the materials being dispensed can readily be changed without any basic change in the machine structure and without necessity of resorting to critical timing of movement of machine parts.

BRIEF SUMMARY OF THE INVENTION

According to the present invention, a generally rectangular machine frame is provided, which may be made up, for example, of rolled sections. Pivoted to one side of the frame is an oscillatable or swingable arm. Between one end of the frame and the arm there is connected a fluid motor for movement of the arm about its pivotal connection with the frame. Between the other side of the arm and the other end of the frame there are arranged two fluid displacement cylinders. At least one of the cylinders can be adjusted along the arm, and may also be adjustable along the frame so that when the arm oscillates the amount of fluid displaced from the respective cylinder can be varied, thereby to vary the ratio of the volumes of fluid displaced from the respective cylinders.

Further, means are provided for varying the stroke of the arm in its swinging movements about the pivotal support therefor so that not only can the ratio of the volumes of displaced fluid be varied, as mentioned above, but the total amount of the displaced fluid can also be varied.

The displacement cylinders are connected to chambers which are filled with oil and within which chambers are stainless steel bellows sealed to one end wall of the chamber so that the supply of oil to the chambers and the withdrawing of oil therefrom will collapse the stainless steel bellows and permit expansion thereof respectively.

Each stainless steel bellows is connected with a source of respective material under pressure by a conduit, with the conduit containing a check valve opening from the source toward the respective bellows. Each source, which is advantageously in the form of a closed container, may include a stirring mechanism therein and is held under air pressure so that the material therein will be caused to flow, through the aforementioned conduit and check valve to the respective stainless steel bellows whenever oil is withdrawn from the chamber in which the bellows is mounted.

There is further provided a mixing head which has a conduit leading to the downstream side of each of the check valves in the conduits leading between the aforementioned sources and the respective stainless steel bellows. Thus, whenever a stainless steel bellows is collapsed by a supply of oil to the respective chamber, the molding material displaced from the bellows is caused to flow to the mixing head.

The mixing head has a valve therein for each of the materials supplied thereto and which valves are normally held closed by spring pressure, or by a combination of spring pressure and air pressure so that the valves will only open when a predetermined relatively high pressure is established on the material being supplied thereto. The valve outlets enter a common mixing chamber is substantially opposed relation via relatively small ports so that when the valves open, the materials enter the mixing chamber in the form of high velocity jets and the materials are violently admixed and leave the mixing chamber in a fully and thoroughly mixed state. The materials leaving the mixing chamber flow directly in a mold cavity to be filled.

The mixing chamber may include purging means, if so desired, and which purging means may, for example, consist of means for blowing air through the mixing chamber, thereby to dislodge any residual material therefrom following the filling of a mold cavity.

The exact nature of the present invention will become more clearly apparent upon reference to the following detailed description taken in connection with the accompanying drawings in which.

DETAILED DESCRIPTION OF THE INVENTION

Figure 1:
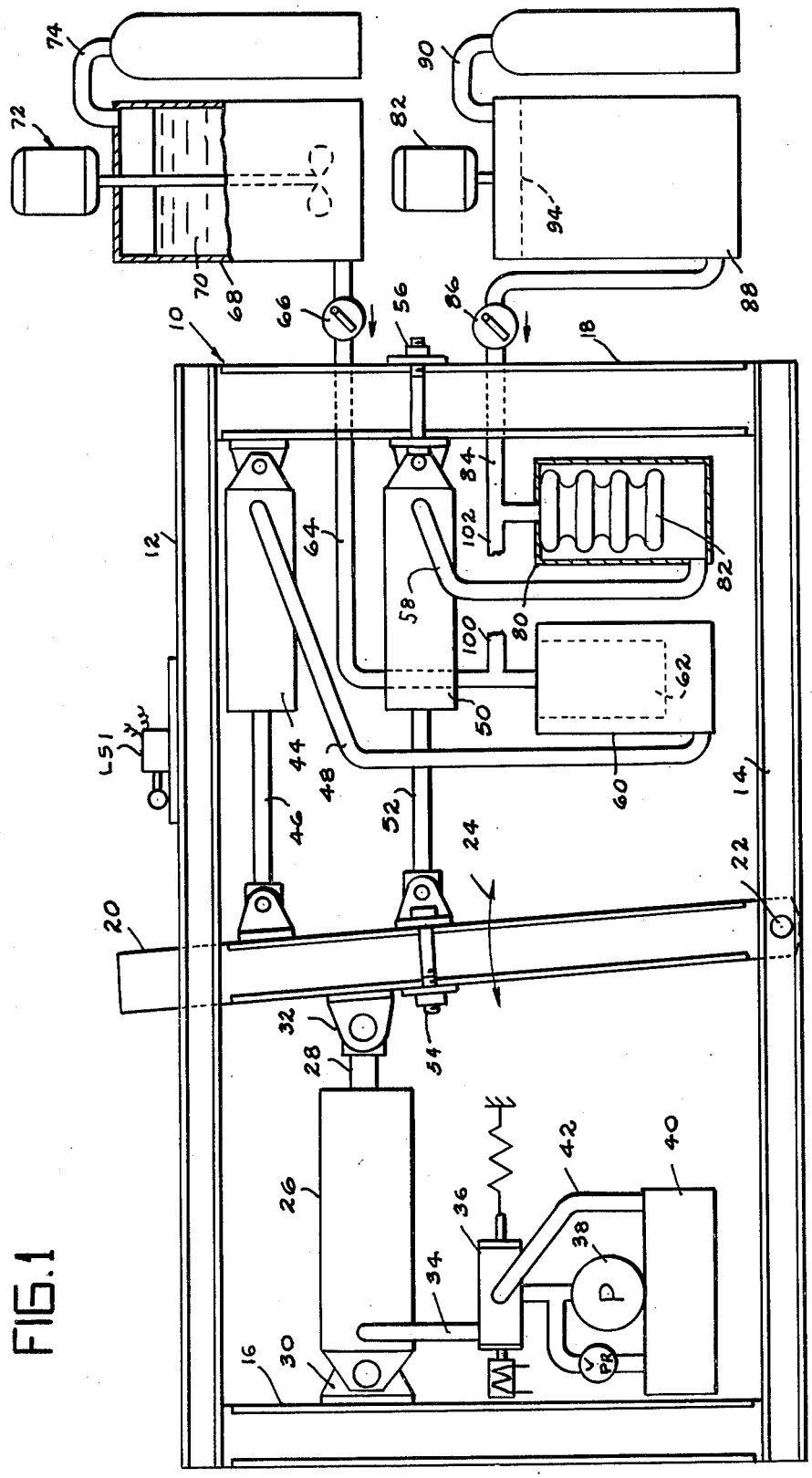
FIG. 1 is a more or less schematic view showing a molding machine constructed according to the present invention.

Referring to the drawings somewhat more in detail, the frame of the machine, generally indicated at 10, may consist of back-to-back channels 12 at the top of the machine and back-to-back channels 14 at the bottom of the machine. Vertically extending sections 16 and 18 are provided at the opposite ends of the machine and the web portions only thereof extend down between the back-to-back channels 14 and upwardly between the back-to-back channels 12 and are fixedly secured thereto to arrive at a rigid machine frame in a relatively inexpensive manner.

An arm 20 is provided which also comprise an H member with the web portion only extending between back-to-back channels 14 and pivoted thereto by pivot means 22. The upper end of the arm also has the web portion only extending between back-to-back channels 12 and freely moveable in the right and left-hand directions therein, as indicated by arrow 24 in FIG. 1.

A first fluid motor is provided comprising a cylinder 26 and a ram 28 with the cylinder pivotally connected to end member 16 of the frame as by the mounting 30, while the outer end of the ram is pivotally connected to arm 20 as by the mounting member 32.

The fluid motor 26 may receive fluid by way of a conduit 34 from a control valve 36 which, in turn, receives pressure fluid from the discharge side of a pump 38 having the suction side connected to reservoir 40. Fluid discharge from motor 26 flows through conduit 34 and valve 36 and conduit 42 back to reservoir 40. The fluid motor 26 is shown as single acting but it will be evident that this motor could be a double acting motor, if so desired.

Connected between the right-hand side of arm 20 and right-hand end member 18 of the frame is a further cylinder 44 with a ram 46. This cylinder has a single conduit 48 leading therefrom. When arm 20 is moved in the clockwise direction about its pivot 22 to push ram 46 into cylinder 44, fluid will be displaced from cylinder 44 into conduit 48.

A further cylinder 50 having a ram 52 is similarly connected between the right-hand side of arm 20 and end member 18 except the connection of ram 52 to arm 20 is adjustable along the arm as by yoke means 54, and the connection of the cylinder to end member 18 may also be adjustable vertically on end member 18 as by yoke means 56. Similarly to cylinder 44, cylinder 50 has a single conduit 58 leading therefrom so that when arm 20 moves clockwise about its pivot 22, fluid will be displaced from cylinder 50 into conduit 58.

Conduit 48 leads to the lower end of a closed pressure vessel or chamber 60 which has therein a stainless steel bellows 62 which, at the upper end, is connected to the upper wall of chamber 60 and communicates with a conduit 64. Conduit 64 leads to the downstream side of a check valve 66, the upstream side of which is connected with the lower region of a container 68 in which a first molding material 70 is contained. Container 68 may include a motor driven stirring mechanism 72 for maintaining the material therein in a uniform condition.

An air pressure conduit 74 is connected to an upper region of container 68 and maintains a predetermined air pressure on the material 70. The air pressure is advantageously ample for displacing material 70 through check valve 66 and conduit 64 and to the stainless steel bellows 62 with sufficient force to cause the bellows to expand and displace oil from chamber 60 backwardly through conduit 48 to cylinder 44 and drive ram 46 and arm 20 together with ram 28 back to the starting position of arm 20.

Conduit 58 is similarly connected to the lower end of a second chamber 80 which also has a stainless steel bellows 82 therein and which bellows is connected by a conduit 84 and check valve 86 with a container 88 similarly to the arrangement described immediately above. Container 88 is also held under air pressure by an air supply thereto via a conduit 90 and may also have a stirring mechanism 92 therein.

Leading from the downstream side of check valve 66 is a conduit 100 and leading from the downstream side of check valve 86 is conduit 102. Conduits 100 and 102 lead to respective inlet ports of a valved mixing head 104, which is shown in more detail in FIG. 2, and which mixing head includes a mixing chamber 106 in which the materials being supplied to the mixing head become admixed and from the mixed materials flow to a mold cavity.

Any of the several molding materials that require two or more ingredients can be handled in a machine of the nature disclosed. The machine illustrated shows the mixing of only two main ingredients but it will be evident that three or more ingredients could be proportionately dispensed in the same manner.

In the particular arrangement shown, a polyurethene product is being made and chamber 68 may contain polyol, while chamber 88 may contain a material 94 which is isocyanate. One or the other, or both, of the materials can have admixed therewith a blowing agent which may, for example, be Freon gas and which will bring about foaming of the admixed material when the pressure is released from the material during a molding operation. Thus, the Freon gas commences to be active as soon as the molding material enters the mixing chamber but becomes fully active when the material reaches the mold cavity and will cause the material to foam and expand therein.

The advantage of the present invention is to be found in the fact that materials are intimately admixed within the mixing chamber so that an article molded from the foam is characterized by extreme uniformity throughout the body of the article.

Figure 2:
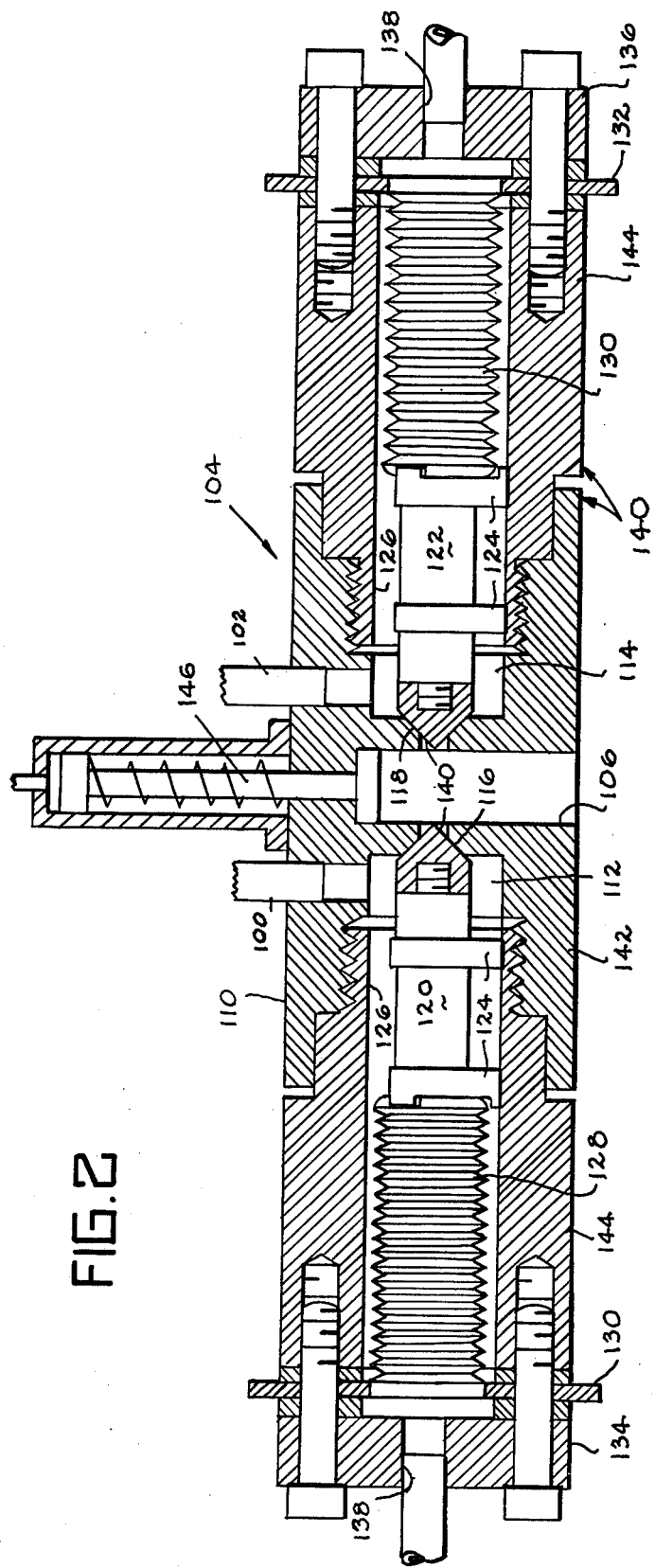
FIG. 2 is a longitudinal section through the mixing head of the molding machine, showing in more detail the important parts thereof.

A particularly important part of the apparatus according to the present invention is the mixing head which is shown in detail in FIG. 2. The mixing head will be seen to comprise a body 110 to which the conduits 100 and 102 are connected as illustrated. Each of the conduits 100 and 102 communicates with a cavity 112, 114, respectively, each of which has a tapering outlet opening 116, 118, respectively, opening into the mixing chamber 106 which has been described previously and which communicates with the mold cavity to be filled.

Each of the chambers 112, 114 is provided with a respective valve member 120, 122, each of which is provided with guide rib means 124 spaced therealong and slidably fitting within the longitudinal bore 126 in which the respective valve member is disposed.

Each of the valve members 120 and 122 at the end opposite the seat engaged by the respective valve member is connected to one end of a respective stainless steel spring bellows 128, 130. The axially outer end of each of the spring bellows is connected to a respective plate 130, 132, which is sealingly clamped to adjacent end of the valve body as by a respective clamping plate 134, 136. Each clamping plate has a threaded port 138 therein through which air under pressure can be supplied to the interior of the adjacent spring bellows thereby to control the bias on the respective valve member which is directed toward the seat engaged by the valve member.

Each valve member has a tapered end portion thereon, indicated at 140 which engages the tapered seat pertaining to the respective valve member with each tip being formed, for example, of babbit metal so as to insure that each valve member will properly seal against its seat so no flow will occur except when the pressure in the respective conduit 100, 102 reaches a valve sufficient to cause the pertaining valve member to move away from its seat.

The valve body, generally indicated at 140 is advantageously formed and there parts and consisting of a center part 142 and two end parts 144 threaded into the center part, as illustrated in FIG. 2.

It will be seen that spaces within the valve body to which the liquid components for the molding material are supplied are completely sealed off from the outside atmosphere. The respective check valves only open when the pressure on the molding material reaches a substantial value, for example, several hundred pounds per square inch and, when the check valves do open, the materials jet into the mixing chamber 106 and become intimately admixed therein, while further incoming liquid presses the mixed material out of mixing chamber 106 and into the mold cavity to be filled. Whenever the pressure on conduits 100 and 102 is reduced the valve members immediately close, thus maintaining the chambers 112, 114 and the other internal parts of the valve structure isolated from the atmosphere.

After a mold cavity is filled, any residue remaining within chamber 106 can be expelled therefrom by directing air under pressure into the rearward end of the cavity as from a high air pressure pipe. A pusher element 146 could also be provided and pushed by air pressure longitudinally through the cavity and thereby expel a slug of material retained in the cavity after a molding operation.

The particular pressure at which the valve members open can be adjusted by adjusting the pressure of the air supplied to the inside of the spring bellows 128, 130, so that the operating conditions of the machine can be adjusted to meet particular circumstances and the mixing of the material within the mixing chamber can be caused to be as violent as desired. It is particularly important to establish highly turbulent conditions within the mixing chamber 106 because the quality of the molded product is, in part, determined by the intimacy with which the component liquids are admixed within the mixing chamber. Once the material leaves mixing chamber 106, the flow of the material is more or less laminar in nature so that the admixing of the material within the mixing chamber is highly important for the molding of work pieces having uniform characteristics, especially large workpieces.

Adjustments of the size of the shot from the machine can readily be controlled as, for example, by mounting a limit switch LS1 on top member 12 of the machine frame in such a position that it will be engaged by arm 20 at a certain tilted position of arm 20 in the clockwise direction about the pivotal support 22 of the arm. By variably positioning limit switch LS1, or by inserting rods of predetermined length between the limit switch and arm 20, the precise stroke of arm 20 can be adjusted so that exactly the right amount of material is dispensed through the mixing head to the mold cavity on each cycle of operation of arm 20. Each cycle of the arm is the motion taken thereby from its rest position, in which it is illustrated in FIG. 1, in the counterclockwise direction sufficiently far to engage and actuate limit switch LS1.

Limit switch LS1 is incorporated in circuitry not shown, and which pertains to solenoid actuating means for valve 36. More specifically, valve 36 may be actuated by a solenoid into position to cause ram 28 to be pushed out from cylinder 26 and, when arm 20 engages limit switch LS1, the solenoid will be deenergized and valve 36 will return to position to exhaust fluid from cylinder 26. At this time the pressure standing on the bellows 62 and 82 will displace oil from chambers 60 and 80 back to cylinders 44 and 50, respectively, and drive the rams 46 and 52 rightwardly therein and cause arm 20 to return to its rest position. Optionally, arm 20 can be returned to its rest position by reversibly supplying fluid to cylinder 26 from valve 36, thereby driving the arm in the clockwise direction under power.

It will be understood that other materials, such as epoxys and polyesters could be molded by utilizing apparatus of the nature disclosed herein because each thereof requires admixing of two or three parts prior to forming the material in a mold cavity.

Modifications may be made within the scope of the appended claims.

What is claimed is:

1. In a molding machine for supplying molding materials to a mold cavity, the improvement being a mixing apparatus comprising: a body with a mixing chamber formed therein and having an outlet adapted for connection to a mold cavity, at least two check valves having outlet means disposed in opposed relation to said chamber whereby streams of liquid molding material discharged therefrom will impinge upon one another in said mixing chamber, molding material supply means for supplying relatively measured amounts of respective molding materials simultaneously to the inlets of said check valves under pressure, and resilient means biasing said check valves toward closed positions with a force such that the pressure on the materials required to open said valves is of such magnitude that high velocity jets of the materials will emerge from the check valves into the mixing chamber and impinge on one another and promote intimate mixing of the materials in said mixing chamber.

2. The molding machine according to claim 1, in which each said check valve comprises a body including a cavity having the respective said inlet in the side and respective said valve outlet in the end thereof, and a valve member reciprocable in said cavity and having one end normally seated in and closing said respective valve outlet, said resilient means including bellows means in said cavity connected at one end to the other end of said valve member and at the other end sealingly connected to said last mentioned body and closing the end of said cavity opposite said valve outlet to confine the material which flows through the valve to said cavity.

3. The molding machine according to claim 2 in which said resilient means also includes means for supplying fluid pressure to the side of said bellows opposite said valve member.

4. The molding machine according to claim 1 in which each said material supply means includes a bellows member, a first conduit having one end in communication with the inside of said bellows member at one end of said bellows member, a pressurized container containing the respective material and connected to the other end of said first conduit, a second check valve in said first conduit opening toward said bellows member, and a second conduit leading from the downstream side of said second check valve to the inlet of the respective first mentioned check valve, each bellows member having said one end thereof sealingly connected to the inside of one end of a respective pressure chamber within which the bellows member can expand and contract, a respective source of hydraulic fluid connected to each pressure chamber on the outside of the bellows member therein, and means for simultaneously displacing selectively measured amounts of hydraulic fluid from each source to the respective pressure chambers to collapse the bellows member therein to displace material from the respective bellows member through the respective first mentioned check valve and mixing chamber into a mold connected to the mixing chamber outlet, said means also being operable for simultaneously reducing the pressure in the respective pressure chambers to permit the respective materials to flow from the pressurized sources thereof into the respective bellows members preparatory to another machine cycle.

5. The molding machine according to claim 4 in which each said source of hydraulic fluid comprises a piston and cylinder with the cylinder hydraulically connected to the respective pressure chamber, a machine frame in which one end of each cylinder is anchored, an arm having one end pivotally mounted in said frame and having said pistons connected thereto, at least one piston being connected to the arm for adjustment along the arm, a motor in the frame for oscillating said arm, and means for controlling the amount of movement imparted to said arm by said motor.

6. The molding machine of claim 1 in which said mixing chamber is substantially cylindrical and has an outlet from which material supplied to the chamber is discharged at one end, and means connected to the other end of said mixing chamber for purging therefrom any residue remaining therein after a mold cavity connected to said outlet is filled.

7. The molding machine of claim 6 in which said means for purging comprises means to supply a blast of air to said other end of said chamber.

* * * * *